(12) United States Patent
Silva

(10) Patent No.: US 11,002,386 B2
(45) Date of Patent: May 11, 2021

(54) LOW EROSION FLUID CONDUIT WITH SHARP SECTION GEOMETRY

(71) Applicant: FMC Technologies, Inc., Houston, TX (US)

(72) Inventor: Gabriel Silva, Kingwood, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 16/250,595

(22) Filed: Jan. 17, 2019

(65) Prior Publication Data

US 2020/0232583 A1    Jul. 23, 2020

(51) Int. Cl.
  *F16L 9/00* (2006.01)
  *F16L 43/00* (2006.01)
  *F16L 57/06* (2006.01)

(52) U.S. Cl.
  CPC .............. *F16L 9/006* (2013.01); *F16L 43/00* (2013.01); *F16L 57/06* (2013.01)

(58) Field of Classification Search
  CPC ..... F16L 9/00; F16L 9/19; F16L 9/006; F16L 43/00
  USPC ...... 138/37, 39, 177, 178, DIG. 11; 285/179
  See application file for complete search history.

(56) References Cited

U.S. PATENT DOCUMENTS

| | | | |
|---|---|---|---|
| 417,992 A * | 12/1889 | Dell | F16L 9/18 138/114 |
| 1,304,036 A * | 5/1919 | Eshelby | F16L 55/04 138/28 |
| 4,336,872 A * | 6/1982 | Noda | B29C 53/086 138/DIG. 11 |
| 4,651,781 A * | 3/1987 | Kandelman | F15B 1/086 138/26 |
| 4,804,733 A * | 2/1989 | Bataille | B29C 61/0608 428/34.9 |
| 5,586,462 A | 12/1996 | Takeuchi et al. | |
| 6,283,159 B1 * | 9/2001 | Tada | F16L 9/18 138/111 |
| 6,289,981 B1 | 9/2001 | Tokizaki et al. | |
| 6,564,831 B1 * | 5/2003 | Sanoner | F16L 9/19 138/115 |
| 6,929,035 B2 * | 8/2005 | Debaisieux | B21C 37/14 138/115 |
| 7,644,733 B2 * | 1/2010 | Jones | F15D 1/065 138/177 |
| 7,967,032 B2 * | 6/2011 | Harada | F02B 29/0456 138/116 |
| 8,926,218 B1 | 1/2015 | Savage | |

(Continued)

FOREIGN PATENT DOCUMENTS

| | | |
|---|---|---|
| CN | 106949120 A | 7/2017 |
| DE | 102008043346 A1 | 5/2010 |

(Continued)

OTHER PUBLICATIONS

Dulay et al., "Fundamentals of Hydraulic Power Transmission", pp. 116-121 (publisher and date unknown).

(Continued)

*Primary Examiner* — Patrick F Brinson
(74) *Attorney, Agent, or Firm* — Henry C. Query, Jr.

(57) ABSTRACT

A fluid conduit has a longitudinal flow passage which includes a transverse cross section that is configured as a polygon, such as a convex or a concave polygon.

31 Claims, 13 Drawing Sheets

(56) References Cited

U.S. PATENT DOCUMENTS

| | | | |
|---|---|---|---|
| 2002/0046830 A1 | | 4/2002 | Ulrich et al. |
| 2004/0206095 A1 | | 10/2004 | Feisthauer |
| 2011/0030829 A1 | * | 2/2011 | Nilsson .................. B01J 35/04 138/42 |
| 2011/0240033 A1 | | 10/2011 | Lally |
| 2011/0240275 A1 | | 10/2011 | Piggott |
| 2015/0129172 A1 | | 5/2015 | Zietlow et al. |
| 2020/0149651 A1 | | 5/2020 | Lee |

FOREIGN PATENT DOCUMENTS

| | | | | | |
|---|---|---|---|---|---|
| EP | 0154104 A2 | * | 9/1985 | ............ | A61M 39/08 |
| GB | 2165328 A | * | 4/1986 | ........... | B65G 53/523 |
| KR | 20-0481250 Y1 | | 8/2016 | | |
| WO | WO 2017/209515 A1 | | 12/2017 | | |

OTHER PUBLICATIONS

Lekner, "Vicious Flow Through Pipes of Various Cross-Sections", European Journal of Physics, vol. 28, pp. 521-527 (Apr. 12, 2007).
"Flow in Pipes", chapter 8 from an unknown textbook, posted online by the University of Oslo and available at the following URL: https://www.uio.no/studier/emner/matnat/math/MEK4450/h11/undervisningsmateriale/modul-5/Pipeflow_intro.pdf.
International Search Report and Written Opinion of the International Searching Authority issued in International Patent Application No. PCT/US2020/012973 (dated May 7, 2020).

* cited by examiner

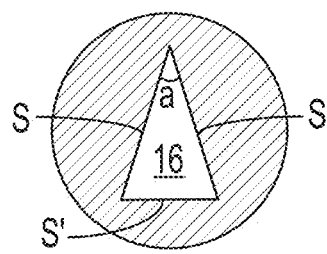
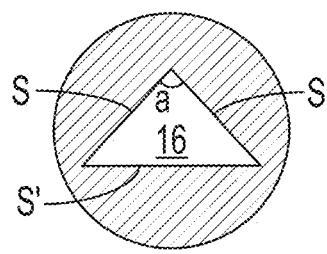
Fig. 13a  Fig. 13b
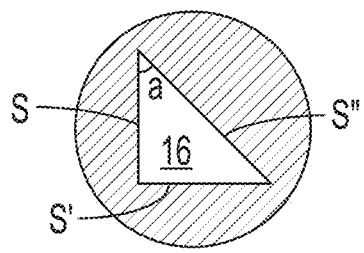
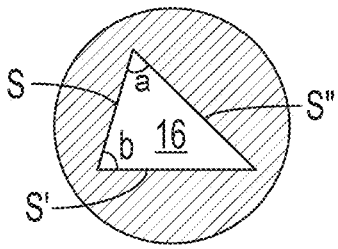
Fig. 13c  Fig. 13d
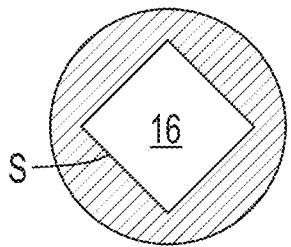
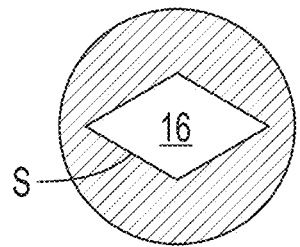
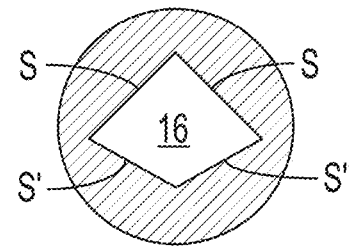
Fig. 14a  Fig. 14b  Fig. 14c
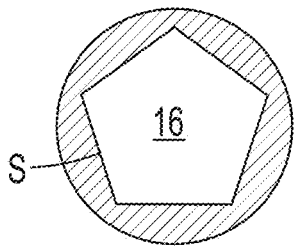
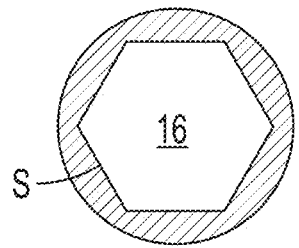
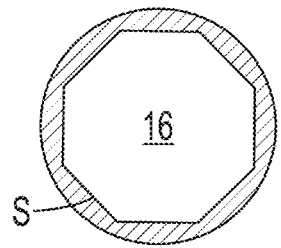
Fig. 15a  Fig. 15b  Fig. 15c
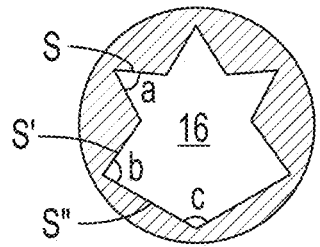
Fig. 15d

LOW EROSION FLUID CONDUIT WITH SHARP SECTION GEOMETRY

FIELD OF THE DISCLOSURE

The present disclosure is directed to fluid conduits. More particularly, the disclosure is directed to a fluid conduit having a flow passage which comprises a cross section that is configured as a polygon, for example a convex polygon or a concave polygon.

BACKGROUND OF THE DISCLOSURE

Prior art flow conduits typically comprise flow passages having circular cross sections. Such conduits are relatively simple to manufacture and are sufficiently strong for most applications. However, fluid conduits having circular flow passages are susceptible to erosion, especially when used to convey fluids at high velocities and/or containing abrasive particles.

The problem with erosion in fluid conduits having circular flow passages is particularly prevalent in pipe bends, such as pipe elbows. Pipe elbows of any angle are notorious for eroding in the presence of high velocity fluids containing abrasive particles such as sand, slurries or any other particles which are generated from upstream wear in the piping system or are introduced into the piping system in applications such as fracking, mining and coal and hydrocarbon transport. Pipe elbows are one of the main sources of erosion-related failures in fracking and hydrocarbon transport.

The prior art has attempted to solve the problem of erosion in pipe elbows by, among other approaches, modifying the geometry of the flow passage, which is typically round, to minimize the effects of erosion due to particles in the fluid impinging on the walls of the flow passage as the fluid changes direction. For example, the flow passage may be given an oval configuration with spiral round area changes. Other approaches to reducing erosion of pipe elbows have included adding baffles or deflectors to direct the flow away from the walls of the flow passage or coating the walls with various materials to better resist abrasive wear. Although these solutions help to reduce erosion, they are limited and short term. In addition, they reduce the flow area of the elbow, thus sacrificing elbow size and performance for less erosion.

SUMMARY OF THE DISCLOSURE

In accordance with the present disclosure, these and other issues in the prior art are addressed by providing a fluid conduit which comprises a longitudinal flow passage having a transverse cross section that is configured as a polygon.

The fluid conduit may comprise, for example, a bend through which the flow passage extends. In another example, the flow passage may comprise the body of a flow control valve through which the flow passage extends. In this example, the flow passage may extend generally linearly or non-linearly through the body.

In accordance with one aspect of the disclosure, the transverse cross section is configured as a convex polygon. For example, the transverse cross section may be configured as a triangle, such as an isosceles triangle, an equilateral triangle, a right triangle or a scalene triangle. Also, the triangle may comprise a side nearest a center of curvature of the bend and said side may be oriented generally perpendicular to a direction of a radius of the bend. In another example, the transverse cross section may be configured as a convex polygon having four sides, such as a square, a parallelogram, a rhombus or a kite. In yet another example, the transverse cross section may be configured as a pentagon, a hexagon, or an octagon.

In accordance with another aspect of the disclosure, the transverse cross section may be configured as a concave polygon. In one example, the concave polygon may have ten sides. In another example, the concave polygon may comprise an asymmetric configuration.

The present disclosure is also directed to a fluid conduit which comprises a plurality of first fluid conduits which are bundled together laterally, each first fluid conduit comprising a longitudinal flow passage having a transverse cross section that is configured as a polygon.

In accordance with one aspect of this embodiment, each first fluid conduit may comprise a tubular member. In addition, each first fluid conduit may comprise a triangular cross section having a base and an apex. Furthermore, the first fluid conduits may be bundled together such that the bases form an outer periphery of the fluid conduit and the apexes form a radially inner aperture.

In accordance with another aspect of this embodiment, the fluid conduit may further comprise a second fluid conduit which is positioned within the aperture. The second fluid conduit may comprise a longitudinal flow passage having a transverse cross section that is configured as a convex polygon. As an alternative, the second fluid conduit may comprise a longitudinal flow passage having a transverse cross section that is configured as a concave polygon.

The present disclosure is further directed to a fluid conduit which comprises a plurality of longitudinal flow passage, each of which comprises a transverse cross section that is configured as a polygon. In one example, the fluid conduit may comprise a bend through which the flow passage extends. In another example, the flow passage may comprise the body of a flow control valve through which the flow passage extends.

In accordance with one aspect of this embodiment, the transverse cross section may be configured as a convex polygon. For example, the transverse cross section may be configured as a triangle.

In accordance with another aspect of this embodiment, the transverse cross section may be configured as a concave polygon. In one example, the concave polygon may have ten sides. In another example, the concave polygon may comprise an asymmetric configuration.

Thus, the fluid conduit of the present disclosure provides an optimized flow passage geometry which significantly reduces erosion and increases component life span without the use of erosion protective coatings, baffles or deflectors. The cross sectional geometry of the flow passage allows for higher flow speeds with particle-contaminated fluids without significant erosion effects. In addition, the cross sectional configuration of the flow passage results in a greater laminar flow regime, less disturbed flow (i.e., low turbulence kinetic energy (TKE)), which is beneficial for downstream flow separation, and notable heat retention, thus requiring less insulation of the flow conduit.

Fluid conduits in the form of pipe bends with triangular flow passages in particular allow for high flows of highly contaminated fluids with significantly less erosive wear. Thus, this geometry can help solve current wear issues found in elbows which are used in hydrocarbon fracking and transport applications. The geometry can also reduce failures of elbows used for slurry type flows found in the mining industry. Such benefits are achieved without the use of baffles, vanes, deflectors or material coatings, which are typically used to reduce erosion in elbows having circular flow passages.

These and other objects and advantages of the present disclosure will be made apparent from the following detailed description, with reference to the accompanying drawings. In the drawings, the same reference numbers may be used to denote similar components in the various embodiments.

BRIEF DESCRIPTION OF THE DRAWINGS

FIGS. 13a-13d are transverse cross sections of fluid conduits in accordance with the present disclosure comprising flow paths which are configured as various triangles;

FIGS. 14a-14c are transverse cross sections of fluid conduits in accordance with the present disclosure comprising flow paths which are configured as various convex polygons having four sides;

FIGS. 15a-15c are transverse cross sections of fluid conduits in accordance with the present disclosure comprising flow paths which are configured as various convex polygons having five, six and eight sides, respectively;

FIG. 15d is a transverse cross section of a fluid conduit in accordance with the present disclosure comprising a flow path which is configured as a concave polygon;

DETAILED DESCRIPTION

The present disclosure is directed to a fluid conduit having a longitudinal flow passage, at least a portion of which comprises a transverse cross section that is configured as a polygon, such as a convex polygon or a concave polygon. The fluid conduit may comprise any component through which a fluid is intended to flow. Examples of fluid conduits to which the present disclosure is applicable include, but are not limited to, pipes, pipe segments, pipe fittings (such as pipe bends, elbows and joints), pup joints, flowlines, flow loops, flowline jumpers, pipelines, manifolds, hydrocarbon production system components, fluid meters and flow control devices, such as flow control valves.

The portion of the flow passage which comprises the polygonal cross section may define the entire flow passage through the fluid conduit or only a portion of the flow passage. For example, a fluid conduit in accordance with the present disclosure may comprise a flow passage having a first end portion which comprises a circular cross section, a second end portion which comprises a circular cross section, and a main portion which extends between the first and second end portions and comprises a polygonal cross section. In this arrangement, the first and second end portions may be configured to provide a smooth transition between the main portion and the circular flow passages of other, conventional components to which the fluid conduit may be connected.

The present disclosure is particularly beneficial to fluid conduits which function to change the direction of fluid flow, such as pipe bends, tees and elbows found, e.g., in manifolds and pipe connections. In accordance with the present disclosure, at least a portion of the fluid conduit includes a bend having a flow passage which comprises a cross section that is configured as a polygon, such as a convex polygon or a concave polygon. The convex polygon may comprise, for example, a triangle. Also, the flow passage may be configured such that the side of the triangle nearest the center of curvature of the bend is approximately perpendicular to the direction of the radius of the bend. When the flow passage comprises a transverse cross section configured as a triangle, the boundary layer of the fluid flow increases and cross currents in the fluid flow are created which contribute to reducing erosion of the flow passage.

Figure 1:
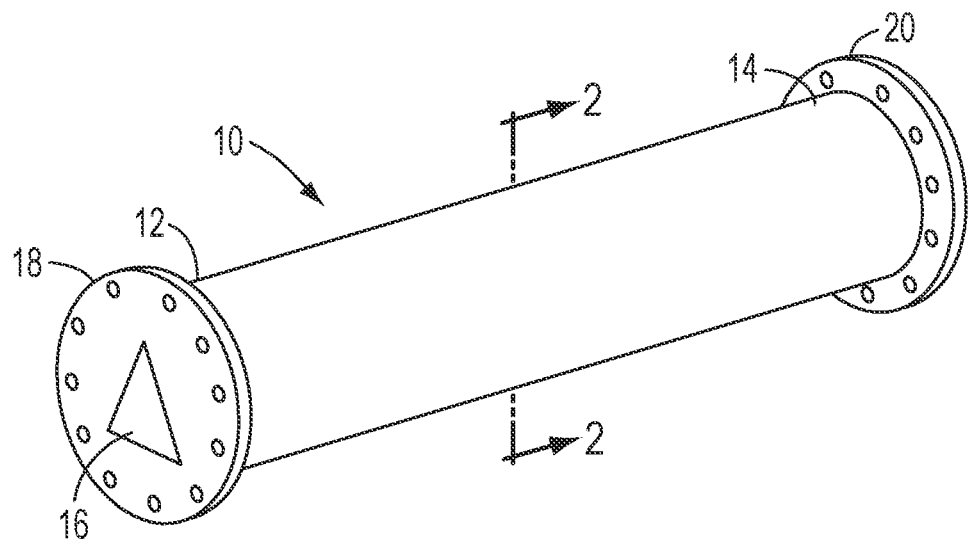
FIG. 1 is a perspective view of a first embodiment of a fluid conduit according to the present disclosure.
Figure 2:
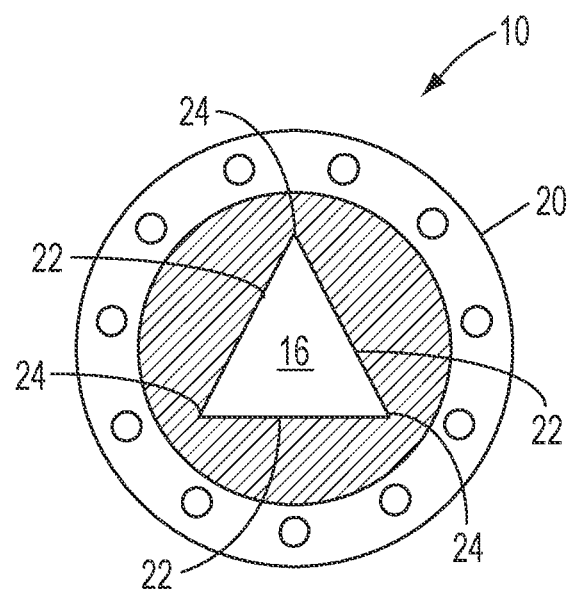
FIG. 2 is a transverse cross sectional view of the fluid conduit of FIG. 1 taken along line 2-2 of FIG. 1.

A first illustrative embodiment of a fluid conduit in accordance with the present disclosure will be described with reference to FIGS. 1 and 2. The fluid conduit of this embodiment, generally 10, is in the form of a generally straight pipe having a first end 12, a second end 14 and a flow path 16 which extends through the fluid conduit between the first and second ends. The fluid conduit 10 may also comprise optional first and second end connections 18, 20 to enable the conduit to be connected to other components of a fluid flow system. Although the end connections 18, 20 are depicted as flange-type connections, they could comprise any suitable type of connection.

As discussed above, conventional fluid conduits typically comprise flow passages having circular cross sections. Such fluid conduits are relatively simple to manufacture and have sufficiently high pressure ratings for many applications. However, fluid conduits with circular flow passages, especially pipe bends and elbows, are susceptible to erosion, particularly when used with fluids flowing at relatively high velocities and containing abrasive particles.

In accordance with the present disclosure, the resistance of the fluid conduit 10 to erosion is improved by configuring the transverse cross section of the flow passage 16 as a polygon, in this case a convex polygon. As shown in FIGS. 1 and 2, for example, the flow passage 16 comprises a transverse cross section which is configured as a triangle having three sides 22 and three vertices 24. The sides 22 and vertices 24 define the longitudinal walls and corners of the flow passage, respectively. In this embodiment, the sides 22 of the triangle are of generally equal length. As will be discussed below, however, the specific shape of the convex polygon, including the lengths of the sides, can be tailored for a particular application in order to minimize erosive wear on the fluid conduit.

Figure 3:
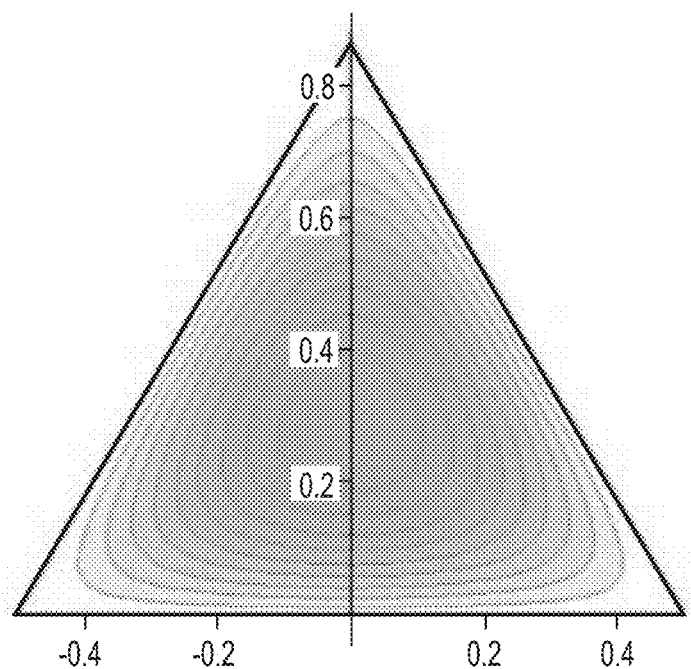
FIG. 3 is a cross sectional representation of a triangular flow path of a fluid conduit according to the present disclosure, showing an example of the flow lines through the flow path.

The affect of the triangular cross section on fluid flow through the conduit is illustrated in FIG. 3, which is a schematic representation showing the distribution of the flow lines throughout the cross section. From FIG. 3, one can see that the flow lines change from triangular near the walls of the flow passage to circular near the center. In effect, the triangular configuration of the flow passage causes the core of the fluid flow to migrate away from the corners of the flow passage. This flow regime creates a relatively thick boundary layer at the walls and corners of the flow passage, which results in the flow being more laminar over a wider range of Reynolds numbers. As a result, impacts of particles on the walls of the flow passage are minimized, which consequently reduces erosion and abrasion of the walls.

Figure 4:
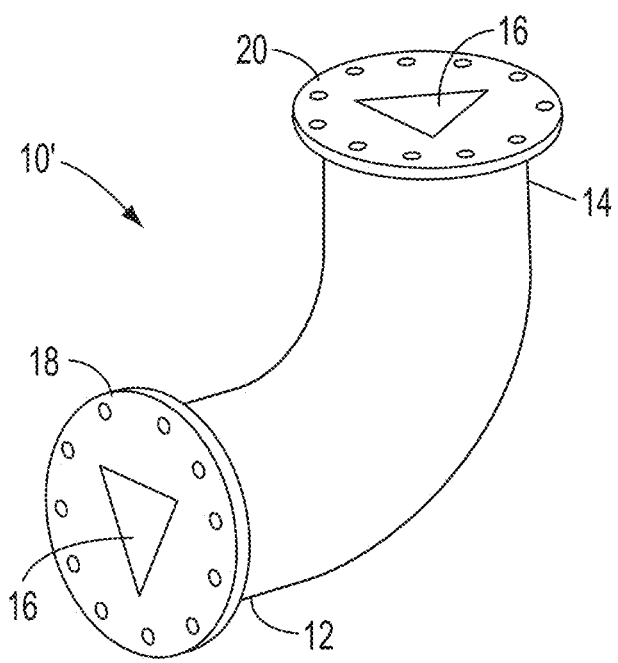
FIG. 4 is a perspective view of a second embodiment of a fluid conduit according to the present disclosure.
Figure 5:
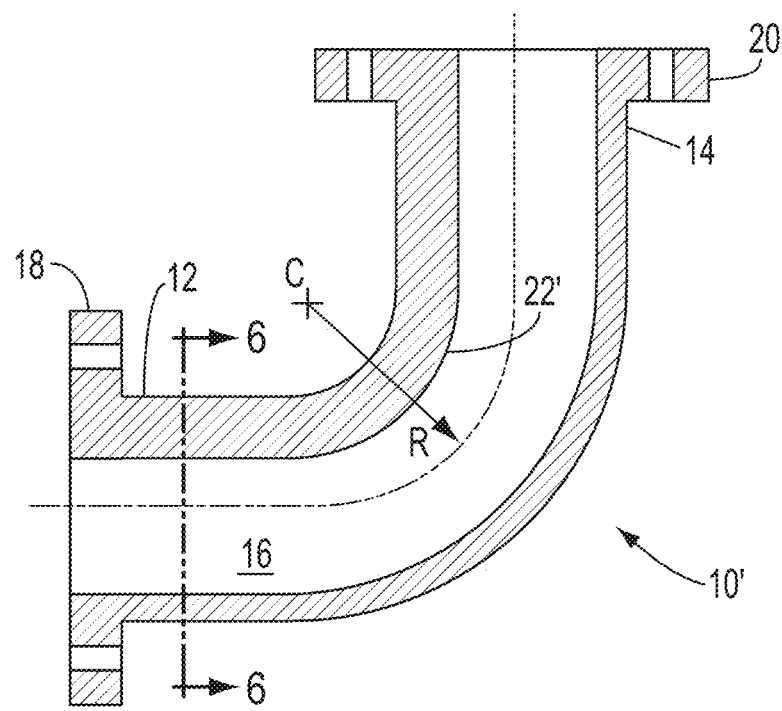
FIG. 5 is a longitudinal cross sectional view of the fluid conduit of FIG. 4.
Figure 6:
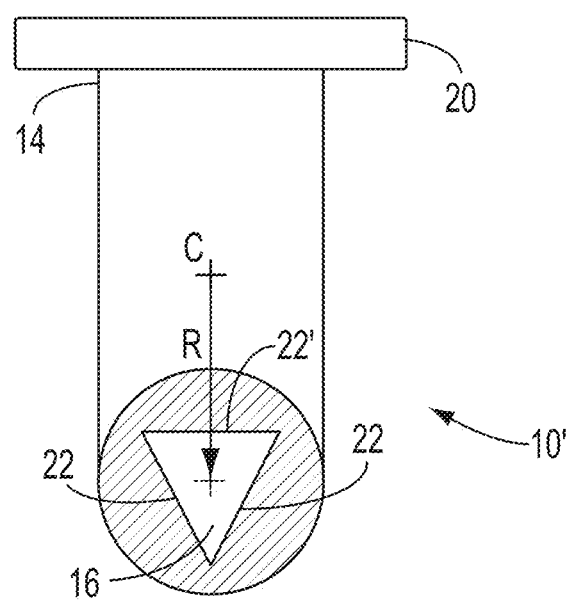
FIG. 6 is a transverse cross sectional view f the fluid conduit of FIG. 4 taken along line 6-6 of FIG. 5.

The cross sectional geometry of the present disclosure is particularly beneficial in fluid conduits which are configured to change the direction of the fluid flow. Referring to FIGS. 4-6, for example, the fluid conduit comprises a pipe bend, such as a ninety degree elbow 10'. The elbow 10' includes a first end 12, a second end 14 and a flow path 16 which extends between the first and second ends. In addition, the elbow 24 may be provided with first and second end connections 18, 20 to enable the elbow to be connected to other components of a fluid flow system. Although the end connections 18, 20 are depicted as flange-type connections, they could comprise any suitable type of connection.

In accordance with the present disclosure, the flow path 16 comprises a transverse cross section which is configured as a polygon, in this case a convex polygon in the form of a triangle. In one embodiment, the flow passage 16 is configured such that a side 22' of the triangle nearest the center of curvature C of the elbow is oriented perpendicular to the direction of the radius R of the elbow 10'. As shown in FIG. 6, such a configuration increases the thickness of the two outer walls of the flow passage 16, thus rendering them better able to withstand erosion.

Figure 7:
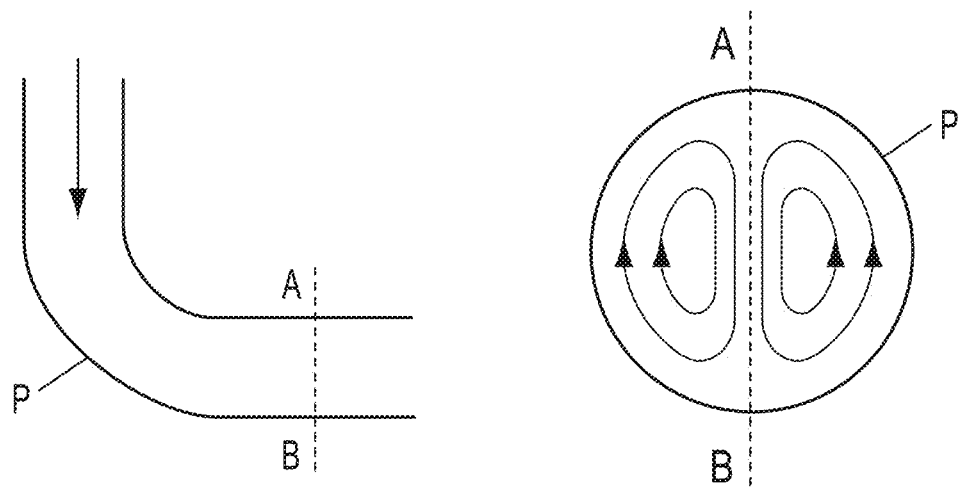
FIG. 7 is a representation of the transverse cross flow currents in a pipe bend comprising a flow path having a circular cross section.

Another benefit of the triangular cross section is that, due to the change in direction of fluid flow through the conduit 10', additional secondary flows are created which minimize the accumulation of particles in the corners of the flow passage 16. Secondary flows are induced when fluid flows around a bend in a pipe. The secondary flows in a flow passage having a circular cross section are depicted in FIG. 7. In FIG. 7, a side representation of a pipe P appears on the left, while a cross sectional representation of the flow passage of the pipe P appears on the right. At the bend, a transverse pressure gradient exists which provides the centripetal force that causes the fluid elements to change direction. However, the pressure gradient required to force the faster moving fluid elements near the center of the pipe to follow the curve of the bend is greater than that required for the slower moving fluid elements near the wall. This results in the fluid near the center of the pipe moving toward the outside of the pipe and the fluid near the wall moving inwards.

Figure 8:
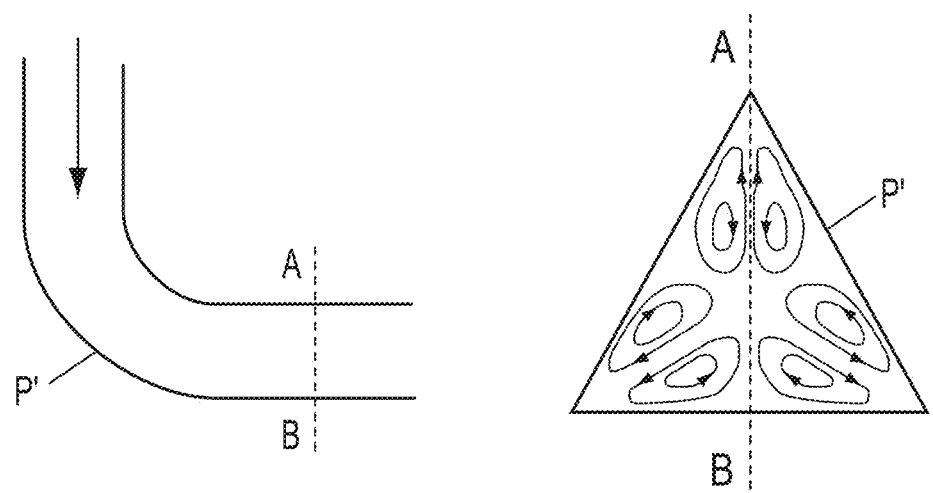
FIG. 8 is a representation of the transverse cross flow currents in a pipe bend comprising a flow path having a triangular cross section.

By comparison, the secondary flows in a flow passage having a triangular cross section are depicted in FIG. 8. In FIG. 8, a side representation of a pipe P' appears on the left, while a cross sectional representation of the flow passage of the pipe P' appears on the right. From FIG. 8, one can see that in the flow passage comprising a triangular cross section, a transverse pressure gradient exists which causes the fluid elements to move away from the corners of the flow passage along the walls of the flow passage and toward the corners of the flow passage near the bisector of the corner. Thus, the secondary flows help prevent particles from accumulating in the corners of the flow passage. In addition, it has been found that the secondary flows create hot spots in the fluid which serve to retain heat, which can be beneficial in certain applications.

Figure 9A:
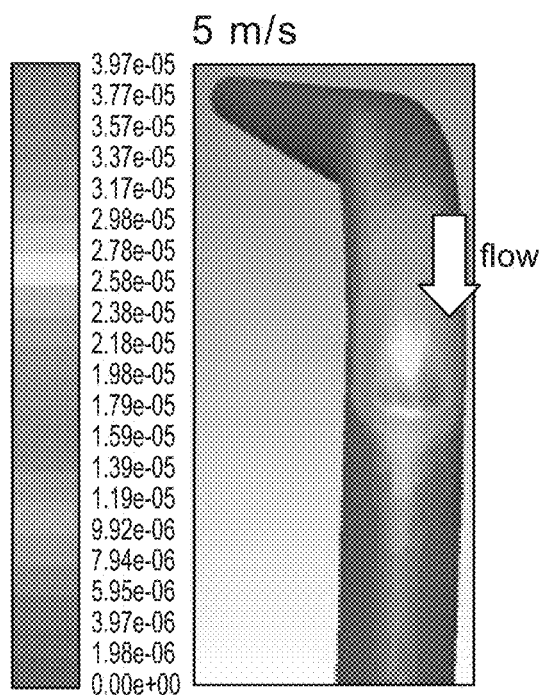
FIGS. 9a and 9b are representations of the results of CFD simulations showing the erosion in a pipe bend having a circular cross section (FIG. 9a) versus the erosion in a pipe bend having a triangular cross section (FIG. 9b) using a fluid having a velocity of 5 m/s and containing 1 percent by volume of particles having a diameter of 300 microns.
Figure 9B:
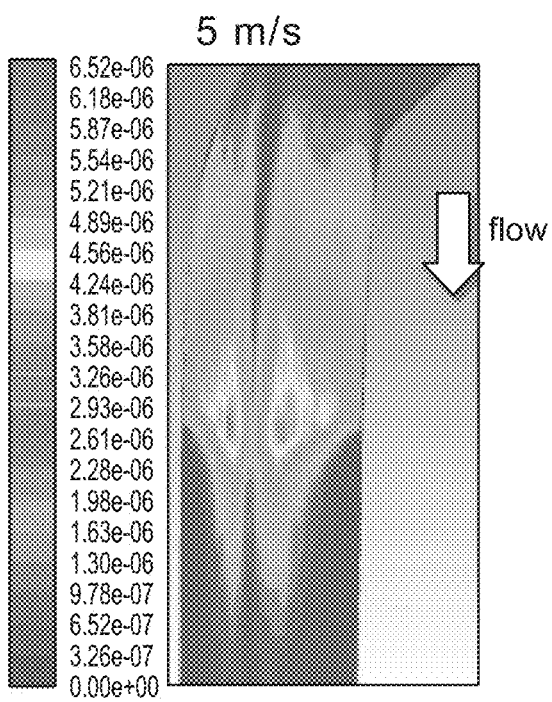
Figure 10A:
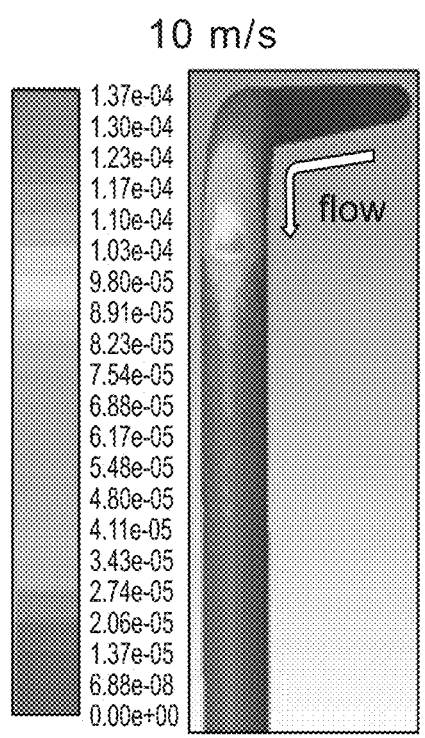
FIGS. 10a and 10b are representations of the results of CFD simulations showing the erosion in a pipe bend having a circular cross section (FIG. 10a) versus the erosion in a pipe bend having a circular cross section which transitions to a triangular cross section (FIG. 10b) using a fluid having a flow speed of 10 m/s and containing 1 percent by volume of particles having a diameter of 300 microns.
Figure 10B:
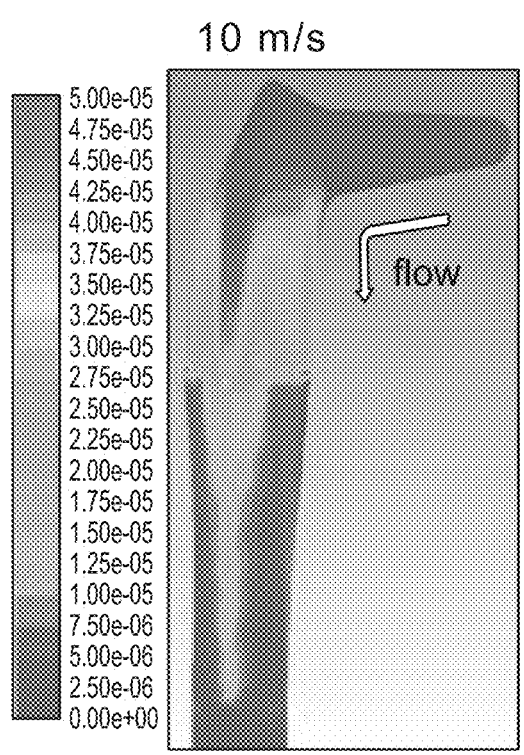

The superior performance of a pipe bend having a triangular flow passage versus a pipe bend having a circular flow passage is illustrated in FIGS. 9 and 10. These figures show the results of computational fluid dynamics (CFD) simulations performed using a fluid containing 1 percent by volume of particles having a diameter of 300 microns. FIGS. 9a and 10a show the results of the CFD simulations for a pipe bend having a circular flow passage for fluid velocities of 5 m/s and 10 m/s, respectively, and FIGS. 9b and 10b show the results of the CFD simulations for a pipe bend having a triangular flow passage (similar to that shown in FIGS. 4-6) for fluid velocities of 5 m/s and 10 m/s, respectively. By comparing FIG. 9a with FIG. 9b and FIG. 10a with FIG. 10b, one can see that the maximum erosion (as measured in mm/kg) on the pipe bend having the circular flow passage is concentrated downstream of the bend on the outer radius of the flow passage, while the maximum erosion on the pipe bend having the triangular flow passage is located downstream of the bend but dispersed over the two outer walls of the flow passage. Also, the degree of maximum erosion on the pipe bend having the circular flow passage is roughly 3-4 times the degree of maximum erosion on the pipe bend having the triangular flow passage. Thus, the pipe bend having the triangular flow passage experienced significantly less erosion under these simulations.

Table 1 below shows the results of simulations on similar pipe bends for liquid velocities of 5 m/s and 10 m/s and sand concentrations of 1 percent by volume (low concentration) and 10 percent by volume (high concentration). In Table 1, the values for maximum erosion are given in terms of mm/kg. As one can see, the degree of maximum erosion on the pipe bend having a circular flow passage is roughly 3-4 times the degree of maximum erosion on the pipe bend having a triangular flow passage for both low and high sand concentrations and at liquid speeds of both 5 m/s and 10 m/s.

TABLE 1

Erosion Results for Triangular and Circular Pipe Bends

| Cross Section | Liquid Velocity | | | |
|---|---|---|---|---|
| | 5 m/s | | 10 m/s | |
| | Low Concentration | High Concentration | Low Concentration | High Concentration |
| Triangular | 1.32E−06 | 1.13E−06 | 9.13E−06 | 8.54E−06 |
| Circular | 3.89E−06 | 4.96E−06 | 3.04E−05 | 1.70E−05 |

Figure 11A:
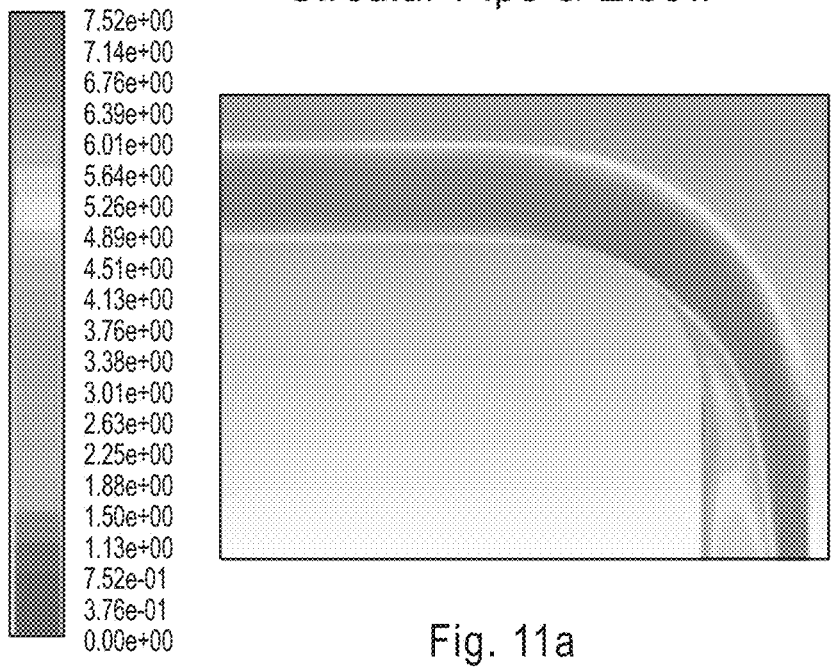
FIGS. 11a-11c are representations of the results of CFD simulations showing the velocity contours for a circular pipe and bend (FIG. 11a), a triangular pipe and bend (FIG. 11b) and a circular pipe which transitions to a triangular pipe bend (FIG. 11c), for an average inlet flow velocity of 6 m/s.
Figure 11B:
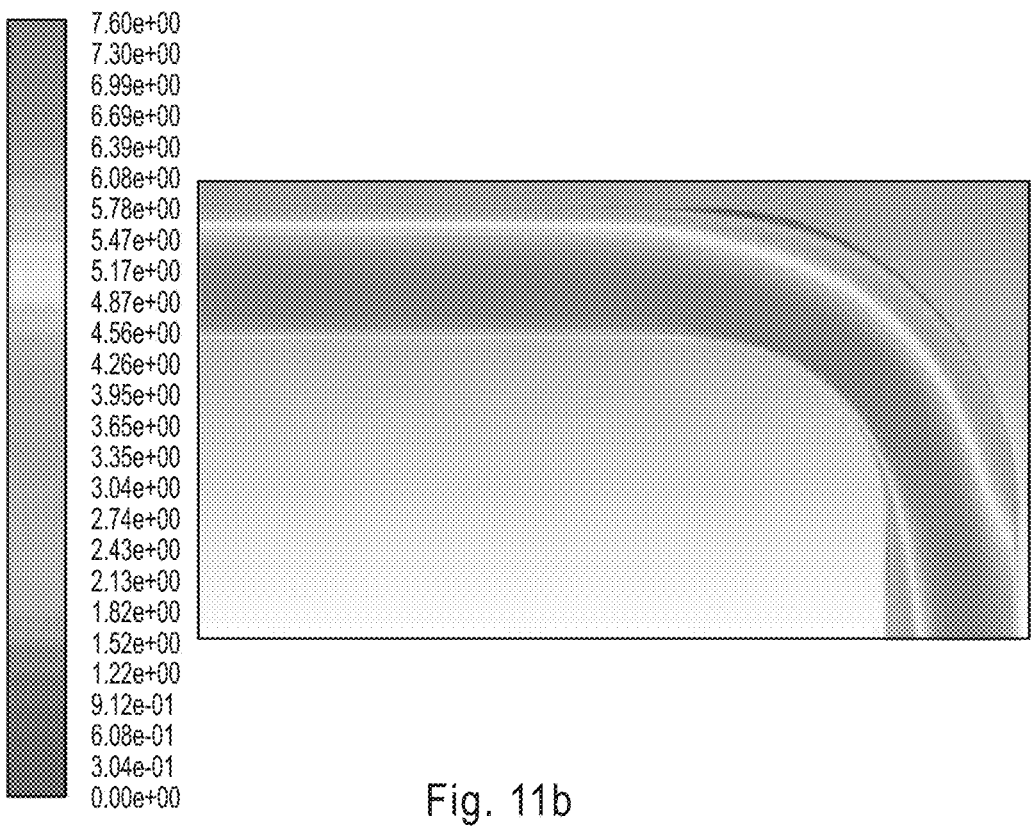
Figure 11C:
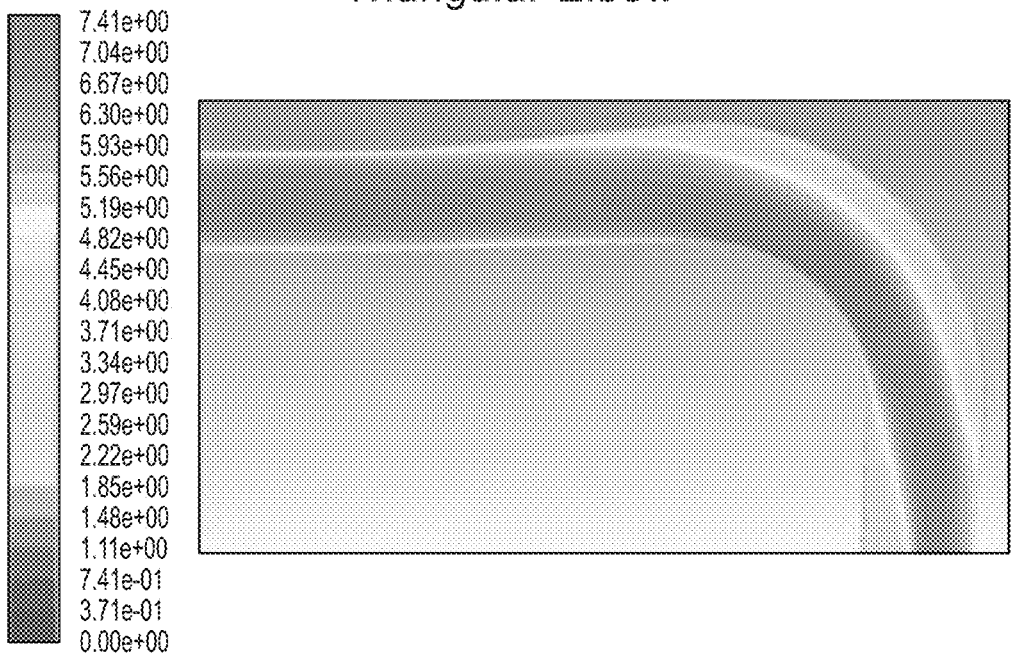

The effect of the triangular cross section in reducing erosion in pipe bends can be illustrated with reference to FIGS. 11a through 11c. These figures are representations of the results of CFD simulations showing the flow velocity contours for three types of elbows: a circular elbow connected to the downstream end of a circular pipe (FIG. 11a), a triangular elbow connected to the downstream end of a triangular pipe (FIG. 11b), and a triangular elbow connected to the downstream end of a circular pipe (FIG. 11c). In these simulations, the average inlet flow speed was chosen to be 6 m/s. As these figures show, the flow velocities at the outer bend radius of each triangular elbow is substantially lower than the flow velocities at the outer bend radius of the circular elbow. Consequently, the erosive effects of the fluid on the outer bend radius will be reduced for the triangular elbows as compared to the circular elbow.

Figure 12A:
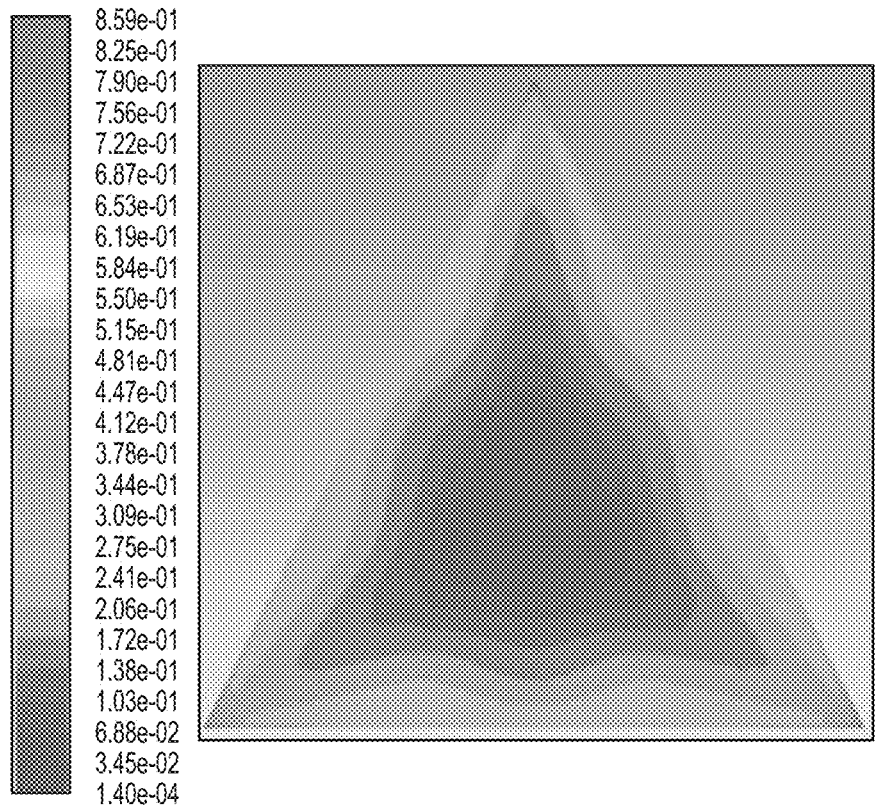
FIGS. 12a-12c are representations of the results of CFD simulations showing the TKE profiles of a triangular pipe bend versus a circular pipe bend in cross flow planes located before the bend (FIG. 12a), mid bend (FIG. 12b) and five times the pipe diameter after the bend (FIG. 12c)
Figure 12A:
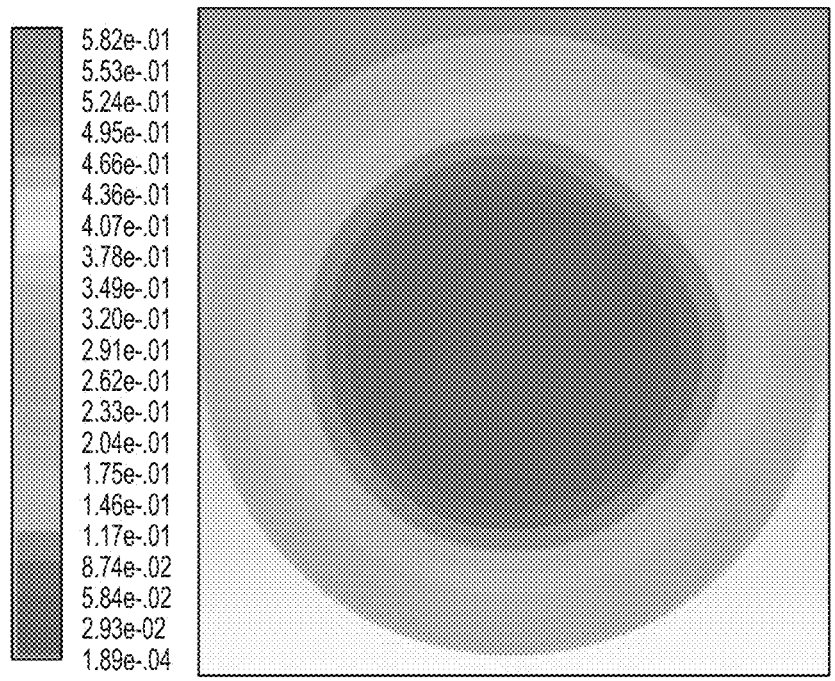
Figure 12B:
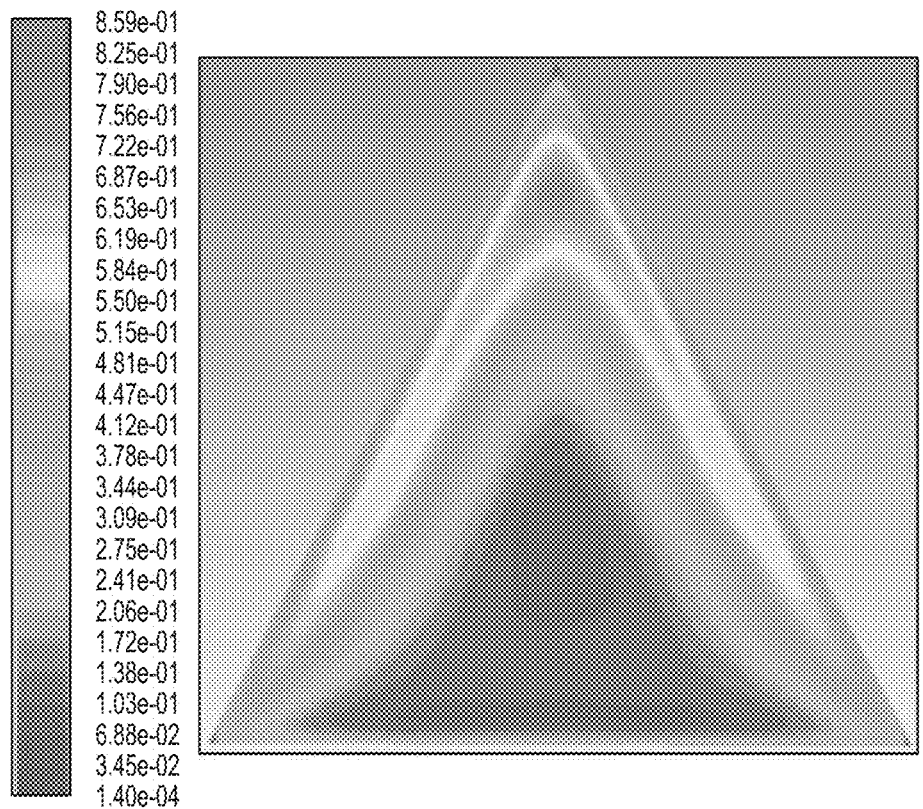
Figure 12B:
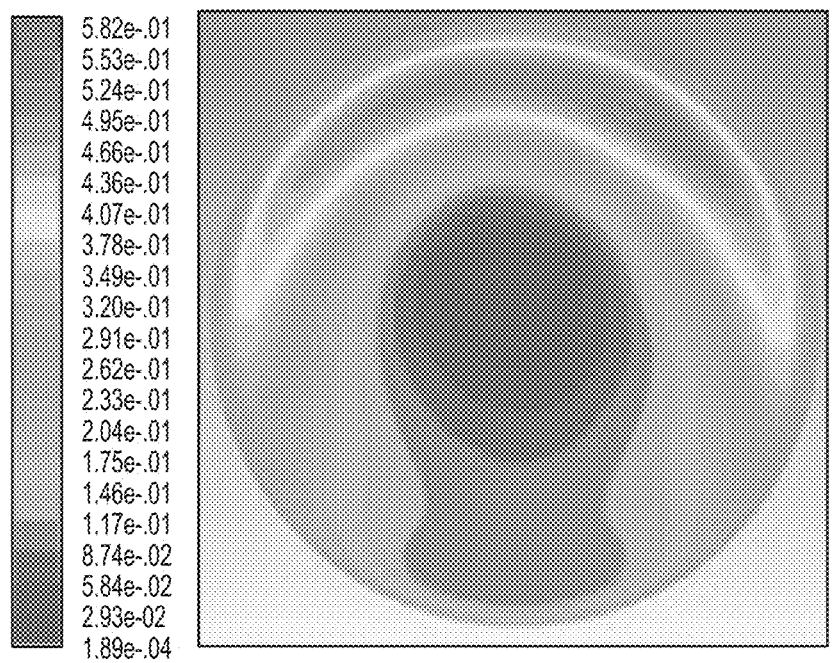
Figure 12C:
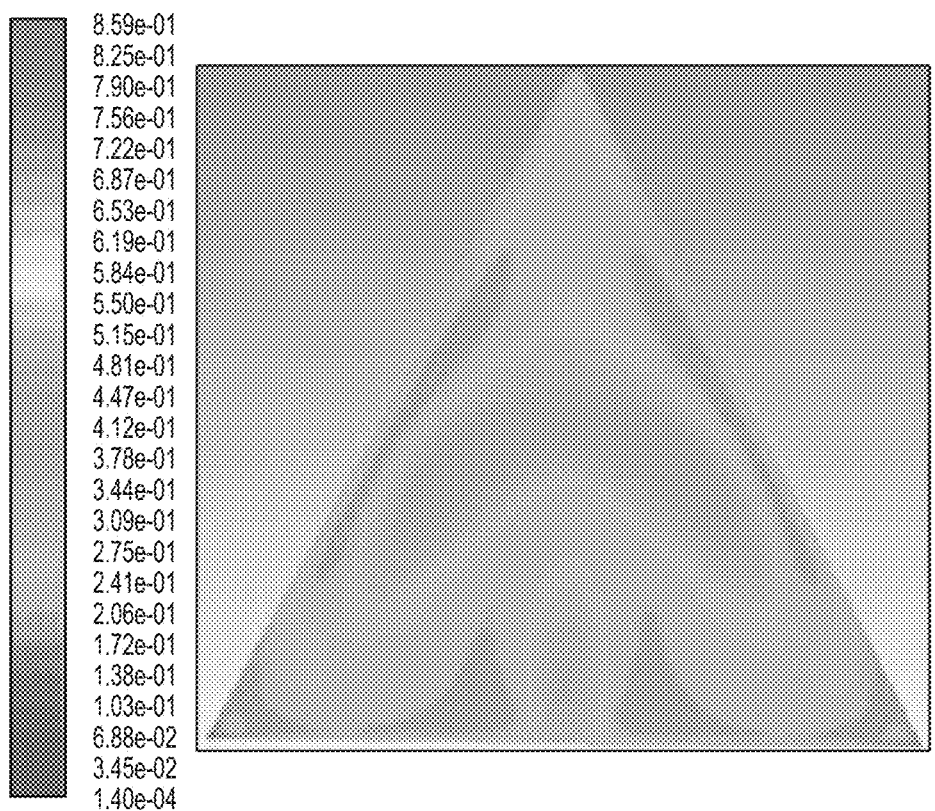
Figure 12C:
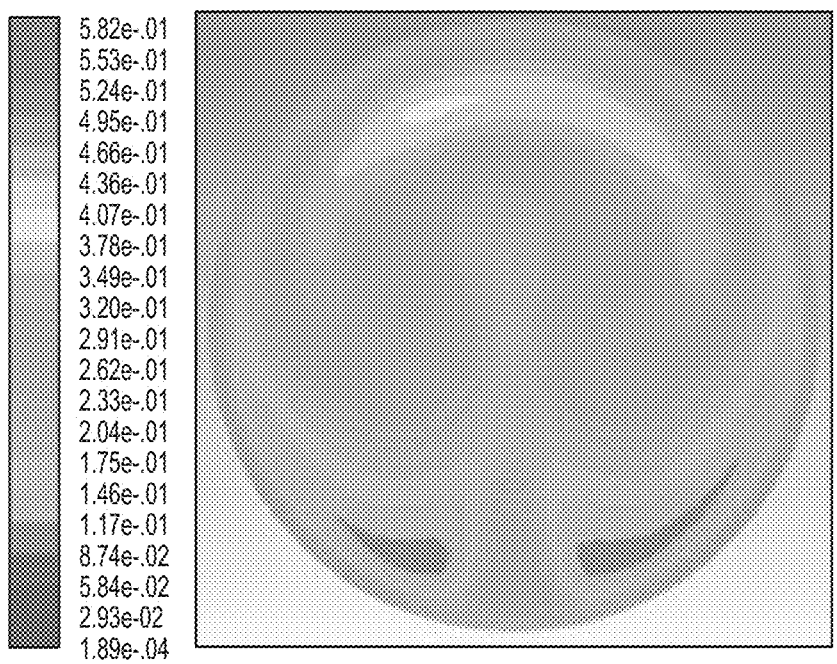

Another advantage of a pipe bend having a triangular flow passage versus a pipe bend having a circular flow passage can be demonstrated by considering the turbulence kinetic energy (TKE) of the fluid flow through these conduits. In fluid dynamics, TKE is the mean kinetic energy per unit mass associated with eddies in turbulent flow. FIGS. 12a through 12c depict the TKE results from CFD simulations performed on pipe elbows having triangular and circular cross sections at three different cross flow plane locations: before the bend (FIG. 12a), mid bend, that is, 45 degrees after the start of the bend (FIG. 12b), and after the bend at a distance of five times the diameter of the pipe. Comparing the TKE profiles at each location, the figures show that while the TKE values for the triangular elbow are slightly lower than the TKE values for the circular elbow both before the bend and mid bend, the TKE values for the triangular elbow are significantly lower than the TKE values for the circular elbow after the bend. Thus, one can conclude that, compared to an elbow with a conventional circular cross section, an elbow with a triangular cross section serves to substantially reduce turbulence in the fluid flow downstream of the bend. This affect can be particularly advantageous when the triangular elbow is used with downstream fluid separators or metering systems, as these devices tend to work best when the fluid flow is laminar.

As discussed above, the specific cross sectional configuration of the flow passage 16 can be designed for a particular application to minimize erosive wear on the fluid conduit. For example, an application may require a 90 degree pipe bend comprising a flow passage having a certain cross sectional area to handle a fluid traveling at a certain velocity and containing an approximate percentage of particles of an approximate size. Given the size and shape of the fluid conduit and the velocity and composition of the fluid, CFD simulations can be run for each of a number of cross sectional configurations to determine the shape which results in the least erosion. The fluid conduit can then be fabricated using various techniques, such as 3D printing, hydroforming, casting, forging or induction welding.

Additional examples of fluid conduits comprising flow passages 16 having triangular cross sections are shown in FIGS. 13a-13d. In FIGS. 13a and 13b, the flow passage 16 is configured as an isosceles triangle having two congruent sides S and a third side S'. In this example, the angle "a" located opposite the third side may have any practical value, such as between about 20 degrees and 110 degrees. In FIG. 13c, the flow passage 16 is configured as a right triangle having two legs S and S', which may or may not be congruent, and a hypotenuse S". In FIG. 13d, the flow passage 16 is configured as a scalene triangle having sides S, S' and S". In these examples, the lengths of the sides and the size of the angles "a" and "b" may be chosen to suit a particular application.

Examples of fluid passages 16 having other cross sectional configurations are shown in FIGS. 14 and 15. FIGS. 14a-14c depict flow passages 16 which are configured as convex polygons having four sides. In FIG. 14a the flow passage 16 is configured as a square having four equal sides S, in FIG. 14b the flow passage 16 is configured as a rhombus having four equal sides S, and in FIG. 14c the flow passage 16 is configured as a kite having two equal sides S and two equal sides S'. In each of these examples, the sides designated S need not be equal to each other, and the sides designated S' need not be equal to each other. Although not shown in the drawings, the flow passage 16 could also be configured as a parallelogram.

In FIG. 15a the flow passage 16 is configured as a pentagon having five equal sides S, in FIG. 15b the flow passage 16 is configured as a hexagon having five equal sides S, and in FIG. 15c the flow passage 16 is configured as an octagon having eight equal sides S. In each of the examples shown in FIG. 15, the sides designated S need not be of equal length. For instance, in the pentagon shown in FIG. 15a, the bottom side may be longer than the remaining sides, thus providing the flow passage with more of a "hut" shaped cross sectional configuration.

FIG. 15d illustrates a flow passage 16 having a transverse cross section which is configured as a concave polygon having a plurality of sides. In this example, the flow passage 16 has ten sides. Moreover, the flow passage 16 may have a symmetrical or, as shown in FIG. 15d, an asymmetrical configuration. In the example shown in FIG. 15d, for instance, the flow passage 16 can be considered to have two opposing sections: a first (or upper, as viewed in FIG. 15d) section having six contiguous sides S of generally equal length, and a second (or lower, as viewed in FIG. 15d) section having two opposing sides S' of generally equal length which are joined by two contiguous sides S" of generally equal length. In addition, in this example the interior angles "a" between adjacent sides S are generally equal, while the interior angle "c" between the two sides S" is larger than the interior angle "b" between each side S" and an adjacent side S'.

The fluid conduits of the present disclosure are suitable for use in a variety of fluid flow systems and piping systems. However, existing fluid flow systems and piping systems typically include conventional conduits having flow passages which comprise circular cross sections. In accordance with the present disclosure, therefore, embodiments of the fluid conduit may be configured to provide a transition between the circular flow passages of conventional conduits and the polygonal flow passages described herein.

Figure 16:
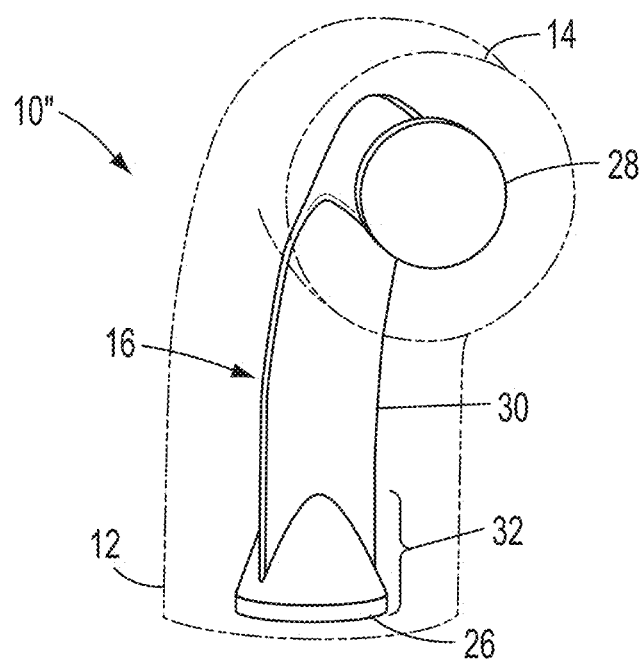
FIG. 16 is a perspective view of another embodiment of a flow conduit in accordance with the present disclosure in which the flow conduit itself is shown in phantom and the flow path is shown shaded for clarity.

An example of such a fluid conduit is shown in FIG. 16. The fluid conduit of this embodiment, generally 10", is similar in several respects to the fluid conduit 10' described above in that it comprises a pipe bend having a first end 12, a second end 14 and a flow passage 16 which extends within the fluid conduit between the first and second ends. In FIG. 16, the fluid conduit 10" is shown in phantom and the flow passage 16 is shaded in order to better illustrate the features of the fluid passage.

In this embodiment, the flow passage 16 includes a first end portion 26 having a circular cross section, a second end portion 28 having a circular cross section, and a main portion 30 which extends between the first and second end portions and comprises a transverse cross section that is configured as a convex polygon, in this case a triangle. The flow passage 16 may also comprise a first transition section 32 connecting the first end portion 26 with the main portion 30 and a second transition section (not visible in FIG. 14) connecting the main section 30 with the second end portion 28. The transition sections provide a smooth transition between the cross section of the main portion 30 and the respective cross sections of the first and second end portions 26, 28, thereby improving fluid flow through the fluid conduit 10".

The configuration of the transition section is preferably designed to provide the least impediment to flow through the flow passage 16. In the embodiment of the disclosure shown in FIG. 16, for example, the transition sections are configured generally as cones having circular cross sections which increase in diameter from the main portion 30 toward the first and second end portions 26, 28. However, the transition sections may have any other suitable configuration. The fluid conduit 10" is therefore capable of providing a smooth transition between the main portion 30 of the flow passage 16 and fluid conduits having circular cross sections.

Figure 17:
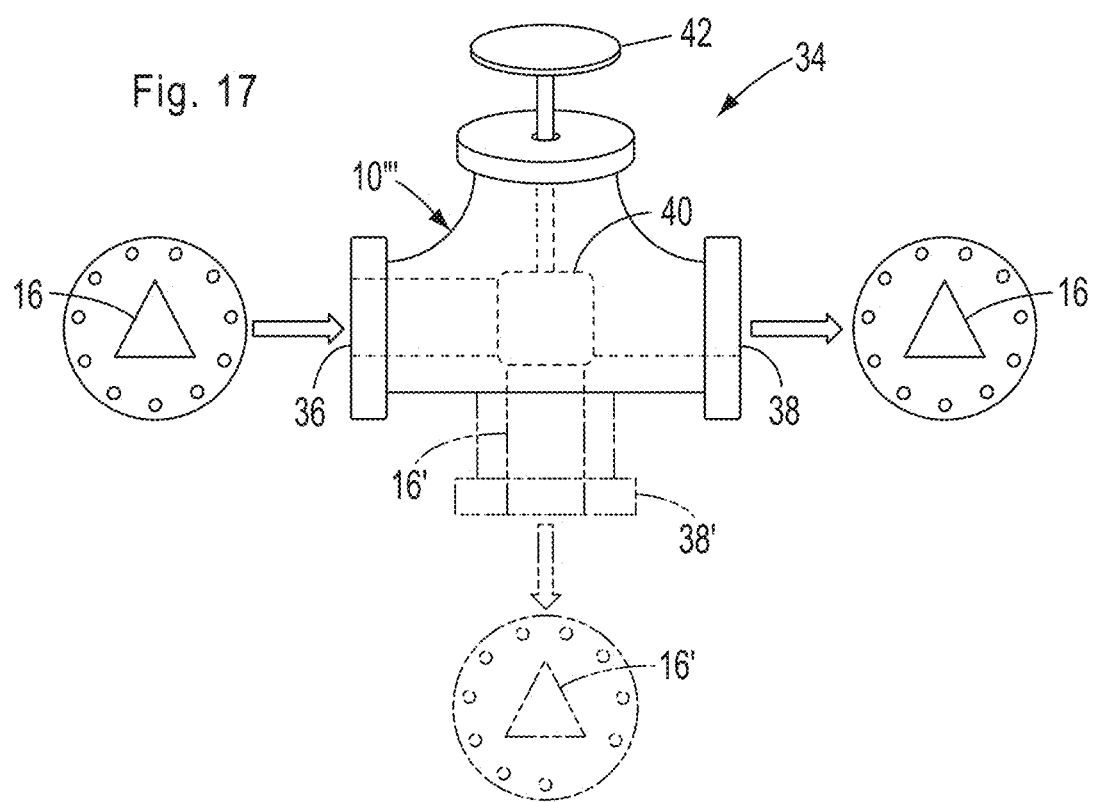
FIG. 17 is a perspective view of an embodiment of a flow conduit in accordance with present disclosure in the form of a flow control valve.

The benefits of the present disclosure are applicable to all types of fluid conduits, including fluid conduits which comprise parts of larger devices and apparatus. Referring to FIG. 17, for example, a fluid conduit in accordance with the present disclosure is shown which forms part of a flow control valve 34. In this embodiment, the fluid conduit, generally 10''', comprises the body of the valve 34. As such; the fluid conduit 10''' includes an inlet end 36, an outlet end 38 and a flow passage 16 which extends through the fluid conduit between the inlet and outlet ends. In accordance with the present disclosure, the flow passage 16' comprises a transverse cross section which is configured as a polygon, for example a convex polygon such as a triangle. The flow control valve 34 may include a valve member 40 positioned across the flow passage 16 to control the flow of fluid through the fluid conduit 10'''. The valve member 40 may be actuated by any suitable means, such as a handwheel 42.

Although the flow passage 16 extends generally linearly through the fluid conduit 10''', the valve 34 may be configured such that the fluid passage extends non-linearly through the fluid conduit. An example of such an alternative embodiment is shown in phantom in FIG. 17. In this example, the fluid conduit comprises a flow passage 16' which extends between the inlet end 36 and an outlet end 38' that is offset 90 degrees from the inlet end. Thus, the fluid conduit' of this alternative is similar to a 90 degree pipe elbow. As discussed above, a flow passage having a triangular cross sectional configuration is especially beneficial in reducing erosion in a pipe bend which is used with high velocity fluids containing abrasive particles. Likewise, the valve 34 of this alternative embodiment is particularly suitable in applications involving high velocity fluids containing abrasive particles.

Figure 18:
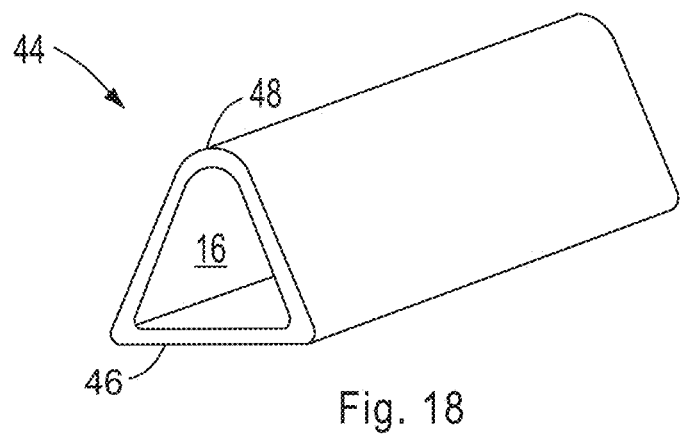
FIG. 18 is a perspective view of another embodiment of a fluid conduit in accordance with the present invention which is particularly suitable for being bundled with other such fluid conduits to form a fluid conduit of larger cross sectional area.

A further example of a fluid conduit in accordance with the present disclosure is shown in FIG. 18. The fluid conduit of this embodiment, generally 44, is a tubular member having a cross section which is configured as a convex polygon. In this example, the fluid conduit 44 is a tubular member having a triangular cross section and, accordingly, a triangular flow passage 16.

In accordance with a further embodiment of the present disclosure, the fluid conduit 44 may be configured to facilitate bundling or otherwise combining several such fluid conduits together laterally or side-by-side to form an aggregate fluid conduit having a larger overall flow passage 16. For example, the fluid conduit 44 may comprise a cross section which is configured as an isosceles triangle having a base 46 and an apex 48 which is formed with an enlarged radius.

Figure 19A:
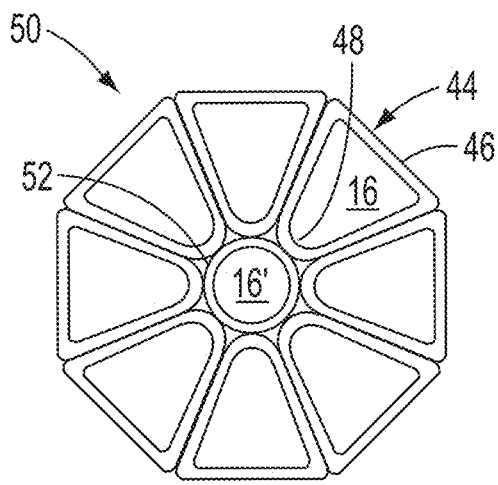
FIGS. 19a and 19b are end views of examples of fluid conduits which are formed by bundling together several fluid conduits such as the fluid conduit of FIG. 18.

As shown in FIG. 19a, a plurality (in this case eight) of fluid conduits 44 may be bundled or nested together laterally or side-by-side to form a larger, aggregate fluid conduit 50. In this example, the fluid conduits 44 are arranged such that the bases 46 form the outer periphery of the fluid conduit 50 and the apexes 48 form a radially inner aperture within which an additional fluid conduit 52 may be positioned, if desired. The fluid conduits 44 and the optional fluid conduit 52 may be secured together by any suitable means, such as welding, and the fluid conduit 50 may have any configuration, such as a straight pipe or a pipe bend.

The effective cross sectional area of the flow passage through the fluid conduit 50 is the sum of the cross sectional areas of the flow passages 16 of the individual fluid conduits 44 and the flow passage 16' of the fluid conduit 52 (if present), which in this example is circular. The flow passages 16 of the fluid conduits 44 and the flow passage 16' of the fluid conduit 52 (if present) may be used to transport the same fluid or different fluids. As discussed above, the secondary flows through fluid conduits which are configured as pipe bends create hot spots which serve to retain heat within the fluid flow. Thus, these hot spots can be used to maintain the temperature of the fluid in the fluid conduit 52 at a desired level.

Figure 19B:
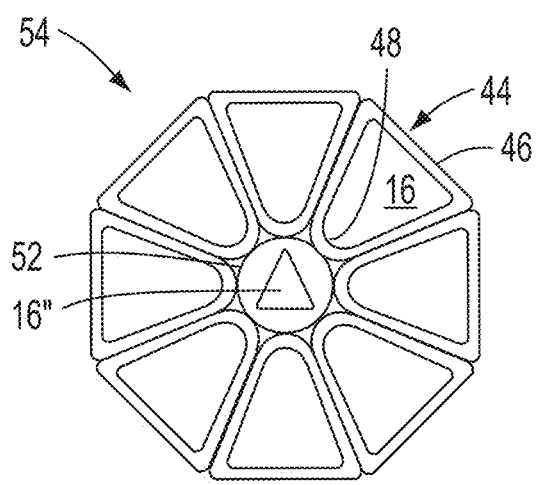

Another example of an aggregate fluid conduit of the type just described is shown in FIG. 19b. The fluid conduit of this embodiment, generally 54, is similar in most respects to the fluid conduit 50. However, in this embodiment the optional additional fluid conduit 52 which is positioned in the radially inner aperture formed by the apexes 48 of the fluid conduits 44 has a flow passage which comprises a triangular cross section 16".

Figure 20:
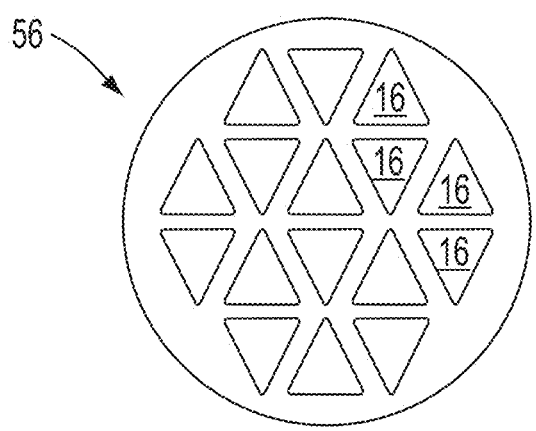
FIG. 20 is an end view of yet another embodiment of a fluid conduit in accordance with the present invention.

Another example of a fluid conduit in accordance with the present disclosure is shown in FIG. 20. The fluid conduit of this embodiment, generally 56, comprises a plurality of flow passages 16 having cross sections which are configured as polygons. In this example all of the flow passages 16 have triangular cross sections. However, the size and cross sectional configurations of the flow passages 16 need not be the same. The number, size, cross sectional configurations and arrangement of the flow passages 16 within the cross section of the fluid conduit 56 can be optimized to achieve a desired temperature profile.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A fluid conduit which comprises an outer surface having a transverse cross section configured as a circle and a single longitudinal flow passage having a non-expandable transverse cross section configured as a polygon.

2. The fluid conduit of claim 1, wherein the fluid conduit comprises a pipe bend and the flow passage extends through the bend.

3. The fluid conduit of claim 1, wherein the fluid conduit comprises a body of a flow control valve.

4. The fluid conduit of claim 3, wherein the flow passage extends generally linearly through the body.

5. The fluid conduit of claim 3, wherein the flow passage extends non-linearly through the body.

6. The fluid conduit of claim 2 or 3, wherein the transverse cross section is configured as a convex polygon.

7. The fluid conduit of claim 6, wherein the transverse cross section is configured as a triangle.

8. The fluid conduit of claim 7, wherein the triangle comprises one of an isosceles triangle, an equilateral triangle, a right triangle or a scalene triangle.

9. The fluid conduit of claim 7, wherein the triangle comprises a side nearest a center of curvature of the bend and said side is generally perpendicular to a direction of a radius of the bend.

10. The fluid conduit of claim 6, wherein the transverse cross section is configured as a convex polygon having four sides.

11. The fluid conduit of claim 10, wherein the transverse cross section is configured as one of a square, a parallelogram, a rhombus or a kite.

12. The fluid conduit of claim 6, wherein the transverse cross section is configured as one of a pentagon, a hexagon, or an octagon.

13. The fluid conduit of claim 2 or 3, wherein the transverse cross section is configured as a concave polygon.

14. The fluid conduit of claim 13, wherein the concave polygon has ten sides.

15. The fluid conduit of claim 13, wherein the concave polygon comprises an asymmetric configuration.

16. A fluid conduit which comprises a plurality of individual first fluid conduits which are bundled together laterally, each first fluid conduit comprising a longitudinal flow passage having a transverse cross section that is configured as a polygon.

17. The fluid conduit of claim 16, wherein each first fluid conduit comprises a tubular member.

18. The fluid conduit of claim 17, wherein each first fluid conduit comprises a triangular cross section having a base and an apex.

19. The fluid conduit of claim 18, wherein the first fluid conduits are bundled together such that the bases form an outer periphery of the fluid conduit and the apexes form a radially inner aperture.

20. The fluid conduit of claim 19, further comprising a second fluid conduit which is positioned within the aperture.

21. The fluid conduit of claim 20, wherein the second fluid conduit comprises a longitudinal flow passage having a transverse cross section that is configured as a convex polygon.

22. The fluid conduit of claim 20, wherein the second fluid conduit comprises a longitudinal flow passage having a transverse cross section that is configured as a concave polygon.

23. A fluid conduit which comprises a plurality of longitudinal flow passage, each of which comprises a transverse cross section that is configured as a polygon, wherein the fluid conduit comprises a body of a flow control valve.

24. The fluid conduit of claim 23, wherein the transverse cross section is configured as a convex polygon.

25. The fluid conduit of claim 24, wherein the transverse cross section is configured as a triangle.

26. The fluid conduit of claim 23, wherein the transverse cross section is configured as a concave polygon.

27. The fluid conduit of claim 26, wherein the concave polygon has ten sides.

28. The fluid conduit of claim 26, wherein the concave polygon comprises an asymmetric configuration.

29. The fluid conduit of claim 1, wherein the flow passage includes a first end portion having a transverse cross section which is configured as a circle, a second end portion having a transverse cross section which is configured as a circle, and a main portion which extends between the first and second end portions and comprises a transverse cross section that is configured as a convex polygon.

30. The fluid conduit of claim 29, wherein the flow passage comprises a first transition section connecting the first end portion with the main portion and a second transition section connecting the second end portion with the main section, whereby the first and second transition sections provide a smooth transition between the cross section of the main portion and the respective cross sections of the first and second end portions.

31. The fluid conduit of claim 30, wherein the first and second transition sections are configured generally as cones having circular cross sections which increase in diameter from the main portion toward the first and second end portions.

* * * * *